United States Patent
Kramer

(10) Patent No.: US 10,829,137 B2
(45) Date of Patent: Nov. 10, 2020

(54) WAGON FOR TRANSPORTING BEACH EQUIPMENT

(71) Applicant: Curt Adam Kramer, Naperville, IL (US)

(72) Inventor: Curt Adam Kramer, Naperville, IL (US)

(*) Notice: Subject to any disclaimer, the term of this patent is extended or adjusted under 35 U.S.C. 154(b) by 0 days.

(21) Appl. No.: 16/272,738

(22) Filed: Feb. 11, 2019

(65) Prior Publication Data

US 2020/0023877 A1 Jan. 23, 2020

Related U.S. Application Data

(60) Provisional application No. 62/700,068, filed on Jul. 18, 2018.

(51) Int. Cl.
| | | |
|---|---|---|
| *B62B 3/10* | (2006.01) | |
| *B62B 3/02* | (2006.01) | |
| *B62B 3/00* | (2006.01) | |
| *B63B 32/80* | (2020.01) | |

(52) U.S. Cl.
CPC .................. *B62B 3/10* (2013.01); *B62B 3/02* (2013.01); *B62B 3/001* (2013.01); *B62B 3/002* (2013.01); *B63B 32/80* (2020.02)

(58) Field of Classification Search
CPC .. B62B 3/10; B62B 3/108; B62B 3/02; B62B 3/001; B62B 3/002; B63B 35/7946; B63B 32/80; B60R 9/08
USPC .............................................. 280/47.34, 79.7
See application file for complete search history.

(56) References Cited

U.S. PATENT DOCUMENTS

| | | | |
|---|---|---|---|
| 4,056,220 A * | 11/1977 | Trimble | B63B 34/00 224/406 |
| 4,602,802 A | 7/1986 | Morgan | |
| 5,823,551 A * | 10/1998 | Conroy | B63B 32/80 280/47.131 |
| 6,142,492 A | 11/2000 | DeLucia | |
| 6,206,385 B1 * | 3/2001 | Kern | B62B 3/02 280/47.35 |
| 6,457,619 B1 * | 10/2002 | Werner | B60R 9/00 224/405 |
| 6,962,370 B2 * | 11/2005 | Simpson | B62D 63/061 280/47.34 |
| 7,017,940 B2 | 3/2006 | Hatfull | |
| 7,070,196 B1 * | 7/2006 | Larsen | B60P 3/1066 211/70.5 |
| 7,963,530 B1 | 6/2011 | Garcia | |
| 8,141,888 B1 | 3/2012 | Levasa et al. | |
| 8,465,031 B2 * | 6/2013 | Coghill, Jr. | B62B 1/14 280/79.3 |
| D757,388 S | 5/2016 | Rocha | |

* cited by examiner

*Primary Examiner* — John D Walters
(74) *Attorney, Agent, or Firm* — Stiennon & Stiennon

(57) ABSTRACT

A beach wagon for transporting water sport boards and smaller objects. The wagon includes a front wall and the rear wall extending vertically from a floor and engaged to side walls; the wagon is carried on a plurality of wheels. The front wall and the rear wall each include a retaining slot. The retaining slots are in substantial alignment to hold a water sport board in the retaining slots spanning between the front wall and the rear wall. The walls of the wagon retain the smaller objects in the wagon. The slotted front and rear walls can be configured to retrofit existing wagons.

6 Claims, 5 Drawing Sheets

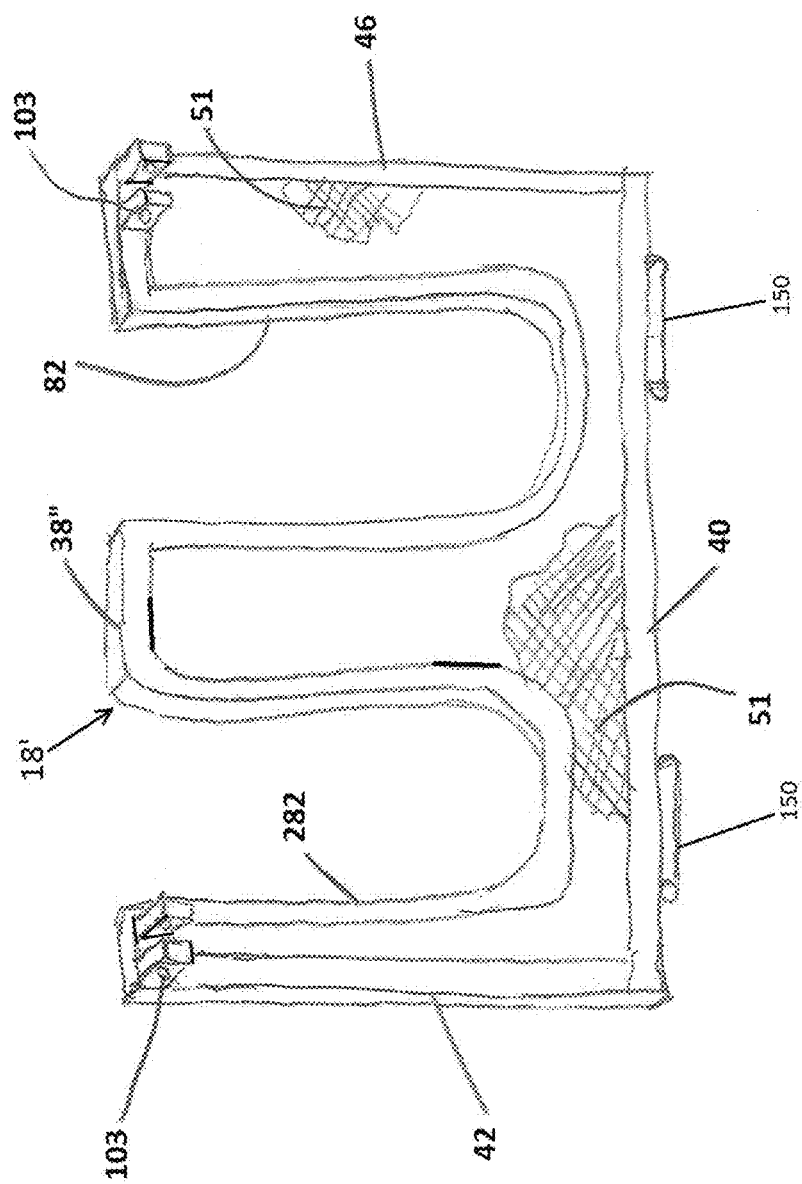

WAGON FOR TRANSPORTING BEACH EQUIPMENT

This application claims the benefit of U.S. Provisional Ser. No. 62/700,068, filed Jul. 18, 2018.

BACKGROUND OF THE INVENTION

This invention relates to a beach wagon that is manually steerable, and has an open-top container for receiving goods, and a provision for carrying water sport boards.

Recreational activities on a beach frequently require hauling food, coolers, beach chairs, sporting equipment, umbrellas, and supplies over distances which are sometimes not able to be conveniently traversed by an automobile. Carrying such articles can be tiring, especially on sand in hot summer weather. Furthermore, with the popularity of water sport boards, the ability to hand carry all of this gear can be overwhelming.

It has heretofore been known to provide a wagon outfitted for transporting articles to and onto the beach. U.S. Pat. Nos. 7,963,530; 8,465,031; 8,453,771; and 5,857,695 disclose a variation of wagons. These patents are herein incorporated by reference to the extent that they are not contrary to the present disclosure.

While such wagons may be useful, they suffer from the drawback of flexibility of use for both small articles and large articles, such as water sport boards.

The present inventor has recognized the desirability of providing a beach going wagon that effectively carries small items as well as one or more water sport boards.

The present inventor has recognized the desirability of providing such a wagon that is of a rugged construction, cost-effectively manufactured and easy to use.

The present inventor has recognized the desirability of providing such a wagon that is small enough to be easily stored when not in use. The present inventor has recognized the desirability of providing a means for retrofitting existing wagons such that the wagons can hold small articles and a water sport board effectively at a reasonable cost.

SUMMARY

An exemplary embodiment of the invention provides a wagon for transporting elongated objects, particularly water sport boards. The wagon includes a floor; a front wall and a rear wall. The front wall and the rear wall extend vertically from the floor. A chassis is carried by a plurality of wheels, such as two, three or four wheels. The floor is carried by the chassis. The front wall and the rear wall each include a retaining slot; the retaining slots in substantial alignment to hold elongated objects spanning between the front wall and the rear wall.

The wagon is particularly suited for holding a water sport board, being wide enough and long enough to prevent the water sport board from tipping out of the retaining slots during transportation on the beach.

The wagon can have a conventional wheel layout, wherein four wheels are arranged in a rectangular pattern.

The wagon can include spaced apart sidewalls, each of said sidewalls connected to each of the front wall and said rear wall. The four walls forming a rectangle to retain articles within the wagon.

Each retaining slot can be oriented open upwardly. The retaining slots can be lined with a soft material, like rubber, or foam, to protect a water sport board carried by the retaining slots.

Alternatively, each of the front wall and the rear wall, can have an additional retaining slot spaced from the aforementioned retaining slots and arranged for carrying a second water sport board between front and rear walls, on the opposite side of the wagon.

Not only does the exemplary embodiment provide for a versatile wagon, the embodiments also provide an effective way to retrofit existing wagons. A wall for a wagon for transporting elongated objects, includes a body providing a barrier for retaining objects within the wagon, and a retaining slot formed into the body, the retaining slot sized to receive a water sport board. The wall can provide formations thereon to engage with adjacent sidewalls of the wagon. Thus the exemplary embodiment wall can have formations, such as lugs, latches and other known means to removably latch the wall to side walls of an existing wagon, replacing the rear wall and front wall of the existing wagon.

The exemplary embodiments of the invention provides for an effective apparatus for moving beach equipment to and over the beach. The wagon is adapted to carry not only small items, retained effectively against spilling out of the wagon, but also heavy, awkward to carry, water sports boards.

Numerous other advantages and features of the present invention will be become readily apparent from the following detailed description of the invention and the embodiments thereof, and from the accompanying drawings.

BRIEF DESCRIPTION OF THE DRAWINGS

FIG. 8 is a front perspective view of a modified back or front wall to be used on the wagon in FIG. 1, to carry water sport boards.

DETAILED DESCRIPTION

Figure 1:
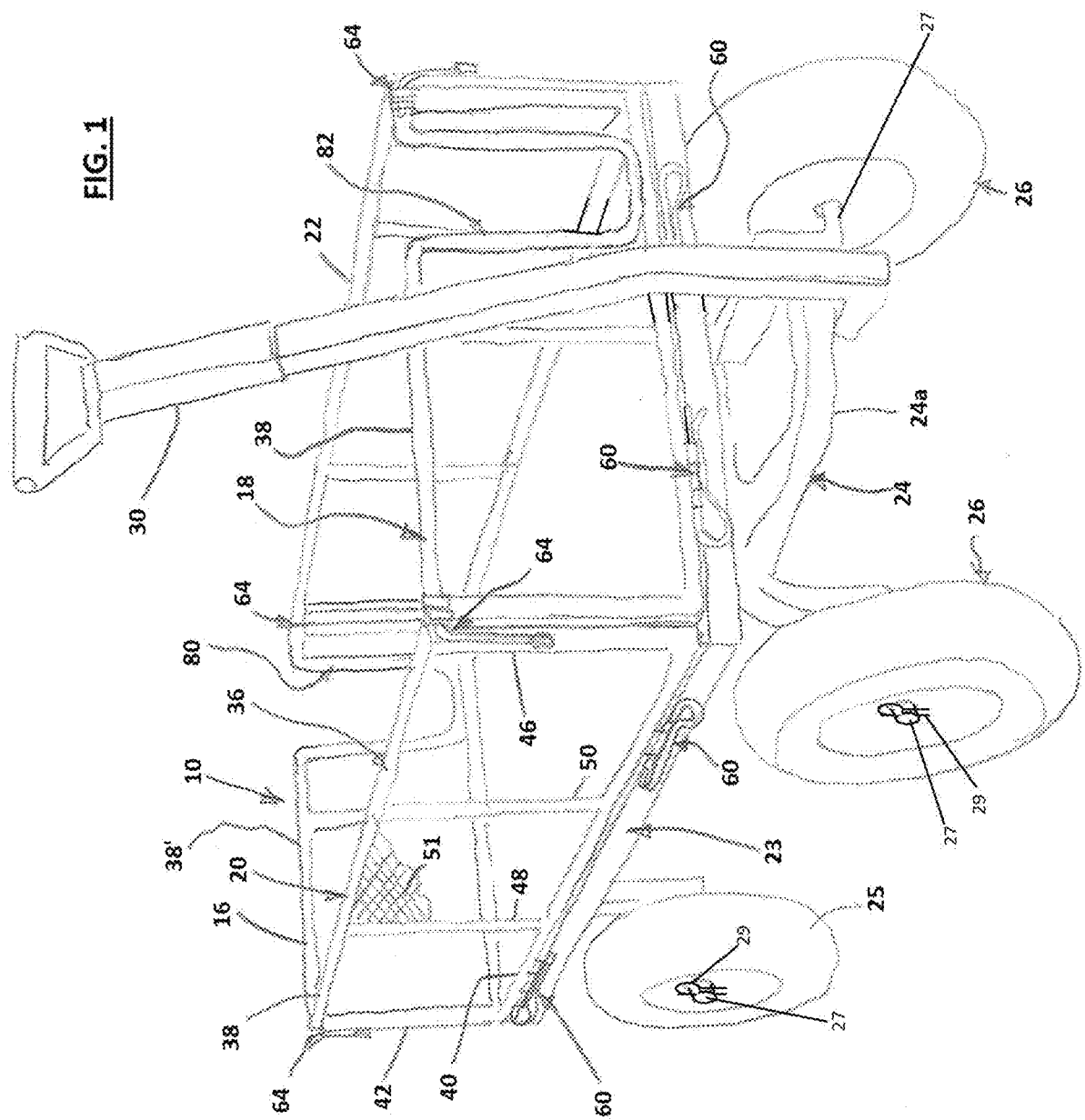
FIG. 1 is a side perspective view of a wagon incorporating an exemplary embodiment of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Ser. No. 62/700,068, filed Jul. 18, 2018 in its entirety.

FIG. 1 illustrates a wagon 10 which incorporates an exemplary embodiment of the present invention. The wagon 10 includes a rear wall 16, a front wall 18, a right side wall 20 and a left side wall 22. The walls 16, 18, 20, 22 are all removably attached to a framed floor 23. The framed floor 23 is carried by a chassis 24 which is carried by rear wheels 25 and front wheels 26, rotatably carried on spindles 27 of the chassis. The wheels 25, 26 include tires that are suitably sized for use on sand at the beach and can be held on the chassis spindles by cotter pins 29. A pull handle 30 is attached to the chassis 24. A front portion 24a of the chassis 24 that is carried by the front wheels 26 is pivotally attached to the framed floor 23 such that the front wheels can be turned and the wagon 10 steered by selective movement of the handle 30.

Although four wheels are shown, it is also encompassed by the invention that only rear wheels are used and the front is lifted and pulled to transport the wagon. Alternately, three wheels can be used with a single front wheel.

The walls 16, 18, 20, 22 and the floor 23 form an open top container having the approximate dimensions of 22.5 inches wide, 44 inches long and 10 inches deep.

Each of the walls 16, 18, 20, 22 has a surrounding frame 36. Each frame includes a top bar 38 (or 38' or 38"), a bottom bar 40, a first side bar 42, and a second sidebar 46. One or more intermediate vertical bars 48, 50 can be incorporated into the frame 36 for added rigidity. Each wall 16, 18, 20, 22 can have a mesh 51 that closes the open areas within the frame 36. For simplicity, only a small portion of the mesh is shown. This mesh helps to contain articles on the framed floor 23 within the wagon, preventing such articles from spilling out of the wagon.

Figure 4:
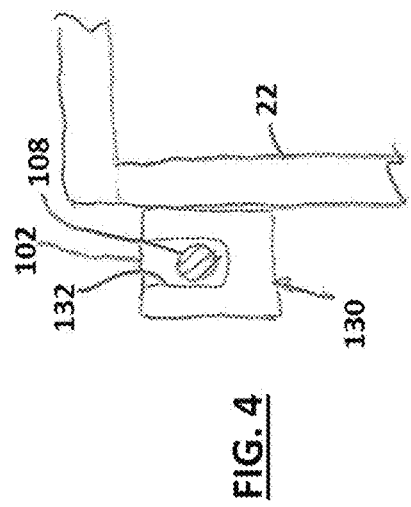
FIG. 4 is a sectional view taken generally along line 4-4 of FIG. 3.
Figure 5:
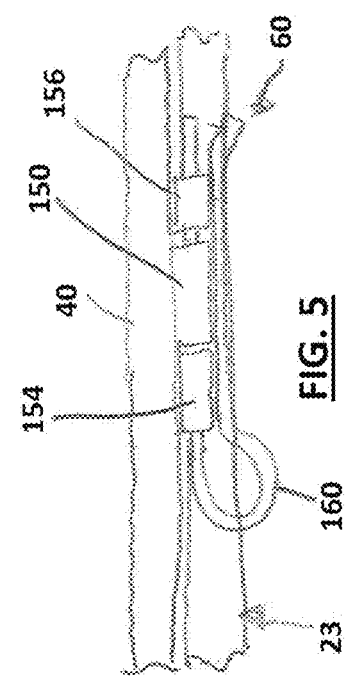
FIG. 5 is enlarged elevation view of a portion of FIG. 2.

Each wall 16, 18, 20, 22 is fastened along its bottom bar 40 by releasable attachments 60 described further in FIG. 5. The frames 36 of adjacent walls are releasably fastened together adjacent to the top bar 38 (or 38' or 38") of each adjacent wall. For this purpose a releasable attachment 64 is used and further described in FIGS. 3 and 4.

The wagon shown in FIG. 1 is conventional except for the rear wall 16 and the front wall 18. While the top bars 38 of the sidewalls 20, 22 are substantially linear throughout, top walls 38' of the rear wall 16 on the front wall 18 are indented to create retaining slots 80, 82 respectively. These retaining slots 80, 82 are described in more detail in FIG. 6.

Figure 3:
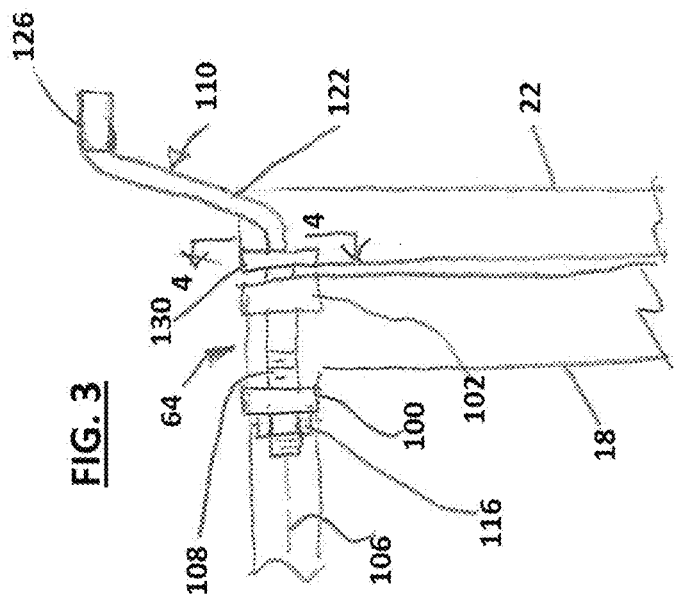
FIG. 3 is an enlarged elevation view of a portion of FIG. 2.

FIG. 3 illustrates the releasable attachment 64 in more detail. The attachment includes spaced apart lugs 100, 102 that have holes 103 (see FIG. 8) that are aligned along an axis 106 such that a threaded rod portion 108 of a handle 110, can be inserted through the holes 103 that are through the lugs 100, 102. A nut 116 is threaded onto an end of the rod portion 108 to retain the handle 110 on the lugs 100, 102. The handle 110 includes a bent-off portion 122 that extends into a grip 126. The handle 110 can be rotated up, as shown in FIG. 3, so the grip can be used to lift the wall 18 from the floor 23 and side wall 22 to remove the wall from the wagon 10.

A lug 130 is fixed to the side wall 22 and includes a top-open slot 132 for receiving the rod portion 108. This (in combination with the attachment 60) locks the wall 18 in place to the respective adjacent wall 22.

Figure 2:
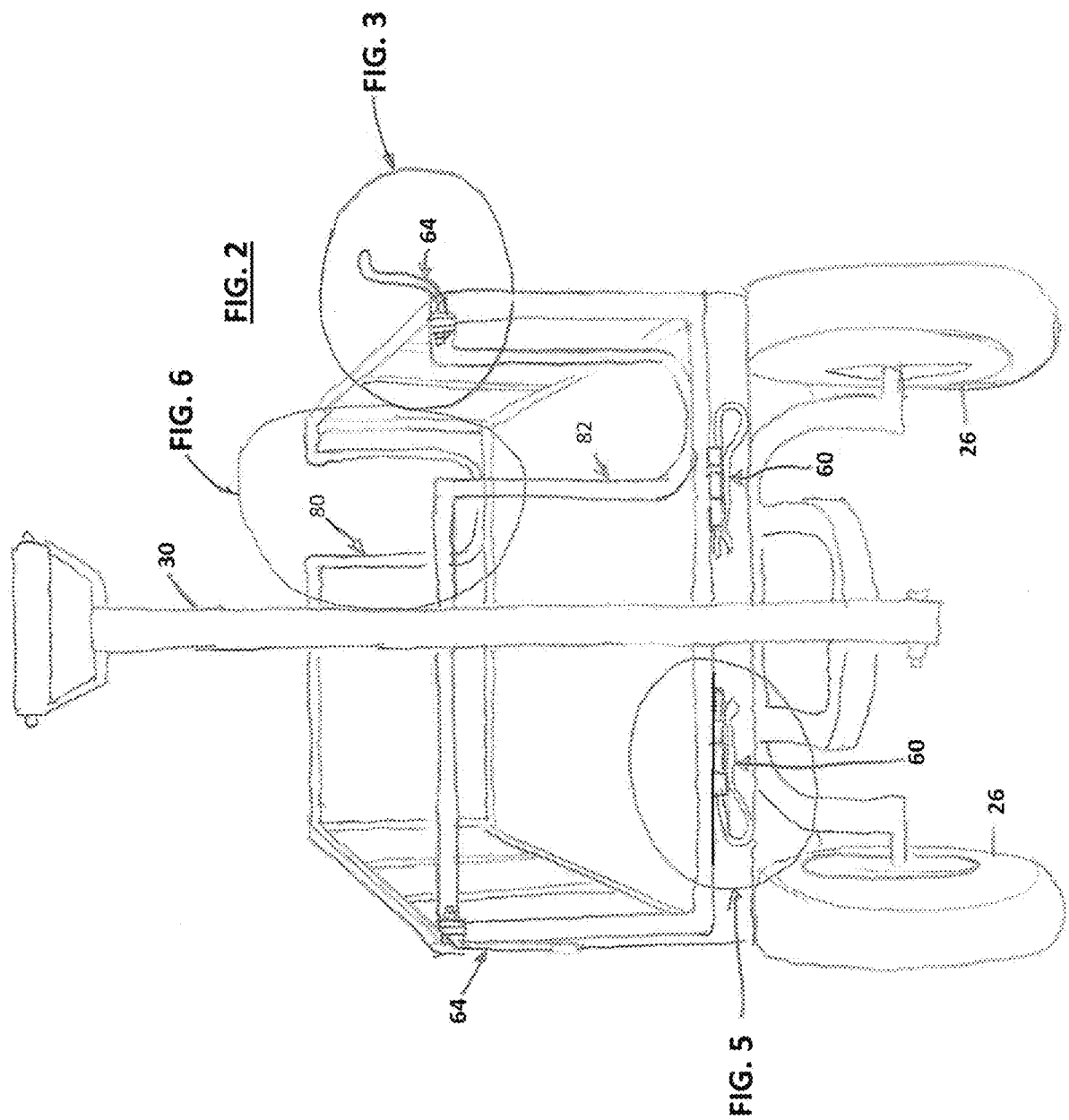
FIG. 2 is front perspective view of the wagon of FIG. 1.

FIG. 5 illustrates the attachment 60 from FIG. 2. The bottom bar 40 includes a cylindrical pin receptacle 150. The framed floor 23 includes a pair of cylindrical pin receptacle 154, 156. When the respective wall is fit up to the framed floor, the cylindrical pin receptacle 150 fits between the cylindrical pin receptacles 154, 156, and the receptacle 150, 154, 156 have through channels that are axially aligned. A cotter pin 160 is inserted through the cylindrical pin receptacles 150, 154, 156 which retains the respective wall to the framed floor.

In operation, the sidewalls 20, 22 are fastened to the floor 23 using the connections 60. Then, the front wall 18 is installed onto the two sidewalls 20, 22 by lowering the respective rod portions 108 down into the slots 132 on the lugs 130 provided on the sidewalls 20, 22. Once the cotter pins 160 are installed for all the attachments 60, the front wall is locked to the floor 23 and to the adjacent side walls 20, 22. Then, the rear wall 16 is installed onto the two sidewalls 20, 22 by lowering the respective rod portions 108 down into the slots 132 on the lugs 130 provided on the rear sides of the sidewalls 20, 22. Once the cotter pins 160 are installed for all the attachments 60, the rear wall is locked to the floor 23 and to the adjacent side walls 20, 22.

Figure 6:
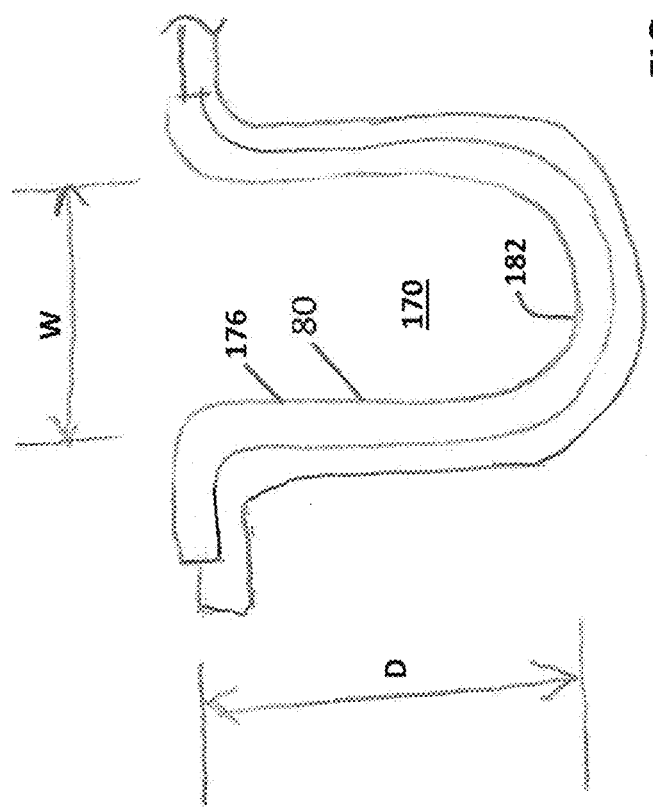
FIG. 6 is enlarged elevation view of a portion of FIG. 2.

FIG. 6 illustrates the retaining slot 80, with the understanding that the retaining slot 82 is identical. The retaining slot 80 is substantially U-shaped and provides an area 170 for receiving a water sport board such as a surfboard, a paddleboard, a wake board, a wind sailing board, a wave board, etc. According to an exemplary embodiment the slot 83 has a depth D of about 10 inches and a width W of about 6 inches. To protect water sport boards from being scratched, a soft liner 176 can be applied over the surface of the top wall 38' within the slot 82. A bottom portion 182 of the slot 80 can be rounded to further protect water sport boards having a rounded profile.

Figure 7:
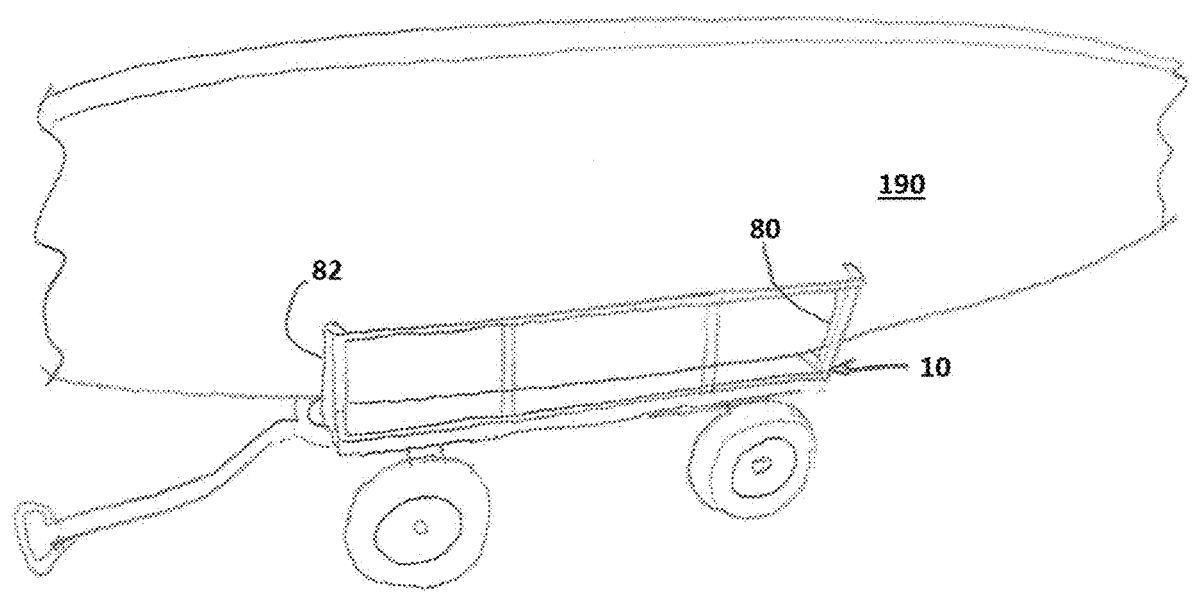
FIG. 7 is a side perspective view of the wagon of FIG. 1 carrying a water sport board.

FIG. 7 illustrates the wagon 10 holding a water sport board 190 in the slots 80, 82 per the invention.

FIG. 8 illustrates a modified front wall 18', which can also be identical to an identically modified rear wall 16' (not shown) with some rearrangement of the connections 60, 64 at the rear wall. In this embodiment a modified top wall 38"' provides two substantially identical spaced-apart retaining slots 82, 282. With the identical configuration of the rear wall, the wagon 10 can now hold two water sports boards, substantially in parallel on the wagon. As shown in FIG. 8, the slot 82 is defined by tubular bar portions which are substantially vertical and parallel.

The invention encompasses a single retaining slot 80, 82 in each of the rear wall 16 and the front wall 18, or two or more retaining slots 82, 282 in each of the rear wall 16' and the front wall 18'.

Because the slots 80, 82 are inboard of, or between the rear wheels 25 and the front wheels 26 the wagon has a more stable center of gravity with the water sport board loaded onto the wagon. This is also true of the wagon with the front and back walls as shown in FIG. 8 for holding two water sport boards.

The rear wall 16 and the front wall 18 as shown in FIG. 1 (or FIG. 8) can be designed to be sold as a replacement wall for conventional wagons to provide the water sport board-holding functionality of the present invention. Although a particular configuration of the wagon is illustrated in FIG. 1, there can be a variety of wagon designs wherein the front and rear walls with the retaining slots 80, 82 can be configured to be compatible with existing wagon designs. The invention is not limited to the particular attachment provisions 60, 64 shown in the drawings but can also be adapted for other known wagon wall attachment configurations.

The embodiments of the walls of the present invention can be composed of known materials for wagons, such as steel or plastic frame elements, and steel or plastic mesh, or any material suitable for the application.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, to the extent that the references are not contrary to the present disclosure.

The invention claimed is:

1. A wagon for transporting beach-related articles and elongated water sport boards, the wagon comprising:
   a chassis;
   a plurality of wheels mounted beneath the chassis;
   a box mounted to the chassis above the wheels, the box having a lower floor, and extending upwardly from the floor a front wall and an opposite rear wall, and two side walls which extend between the front wall and the rear wall, wherein each wall comprises a barrier for retaining beach-related articles within the wagon;
   a pull handle connected to the chassis and extending upwardly in front of the front wall;
   portions of the box which define two bars which are spaced sidewardly from one another to define a front slot; and
   portions of the box which define two rear bars which are spaced sidewardly from one another to define a rear slot, the rear slot being spaced rearwardly of the front slot to receive therein an elongated water sport board to extend between and beyond the front wall and the rear wall, the front slot and the rear slot being positioned sidewardly of the upwardly extending pull handle, such that the elongated sport board does not interfere with the pull handle.

2. The wagon according to claim 1, wherein the slots are lined with a soft material to protect a water sport board carried by the retaining slots.

3. The wagon of claim 1 wherein each wall comprises a frame with a mesh which closes open areas with the frame.

4. A wagon and water sport board assembly comprising:
   a wagon comprising:
      a chassis;
      a plurality of wheels mounted beneath the chassis;
      a box mounted to the chassis above the wheels, the box having a lower floor, and extending upwardly from the floor a front wall and an opposite rear wall, and two side walls which extend between the front wall and the rear wall, wherein each wall comprises a barrier for retaining beach-related articles within the wagon;
      portions of the box which define two bars which are spaced sidewardly from one another to define a front slot, the portions of the bars defining the front slot being substantially vertical;
      portions of the box which define two rear bars which are spaced sidewardly from one another to define a rear slot, the portions of the bars defining the rear slot being substantially vertical, and the rear slot being spaced rearwardly of the front slot; and
   a water sport board engaged with the wagon such that the board extends within the front slot and the rear slot so that portions of the board extend between and beyond the front wall and the rear wall, the water sport board having a surface extending upwardly which defines a barrier to retain articles within the box.

5. The wagon of claim 4 wherein each wall comprises a frame with a mesh which closes open areas with the frame.

6. A wagon for transporting beach-related articles and elongated water sport boards, comprising:
   a chassis;
   a plurality of wheels mounted beneath the chassis;
   a box mounted to the chassis above the wheels, the box having a lower floor, and extending upwardly from the floor a front wall and an opposite rear wall, and two side walls which extend between the front wall and the rear wall, wherein each wall comprises a barrier for retaining beach-related articles within the wagon;
   portions of the box which define two tubular bars which are spaced sidewardly from one another to define a front slot, wherein portions of the bars which define the slot are substantially vertical and parallel;
   portions of the box which define two tubular rear bars which are spaced sidewardly from one another to define a rear slot, the rear slot being spaced rearwardly of the front slot, wherein portions of the bars which define the rear slot are substantially vertical and parallel, and wherein the water sport board is engageable with the wagon such that the board extends within the front slot and the rear slot so that portions of the board extend between and beyond the front wall and the rear wall.

* * * * *